US012205152B2

(12) United States Patent
Berry et al.

(10) Patent No.: US 12,205,152 B2
(45) Date of Patent: *Jan. 21, 2025

(54) ONLINE REVIEW GENERATION USING A REDIRECTION CONTAINER

(71) Applicant: Yext, Inc., New York, NY (US)

(72) Inventors: Benjamin Berry, New York, NY (US); Calvin Casalino, New York, NY (US); Marc Ferrentino, New York, NY (US)

(73) Assignee: Yext, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/198,010

(22) Filed: May 16, 2023

(65) Prior Publication Data
US 2023/0289855 A1 Sep. 14, 2023

Related U.S. Application Data

(63) Continuation of application No. 17/714,667, filed on Apr. 6, 2022, now Pat. No. 11,694,238, which is a
(Continued)

(51) Int. Cl.
G06Q 30/0282 (2023.01)
G06F 16/955 (2019.01)
(Continued)

(52) U.S. Cl.
CPC ....... *G06Q 30/0282* (2013.01); *G06F 16/955* (2019.01); *G06Q 30/0201* (2013.01); *H04L 51/046* (2013.01)

(58) Field of Classification Search
CPC . G08Q 30/0282; G06Q 30/00; G06Q 30/0201
See application file for complete search history.

(56) References Cited

U.S. PATENT DOCUMENTS 5,446,891 A 8/1995 Kaplan
5,870,546 A 2/1999 Kirsch
(Continued)

FOREIGN PATENT DOCUMENTS

CN 102779137 A 11/2012
CN 103621047 A 3/2014
(Continued)

OTHER PUBLICATIONS

Qualitative risk avoidance for mined opinions (Year: 2014).*
(Continued)

*Primary Examiner* — Sangeeta Bahl
(74) *Attorney, Agent, or Firm* — Jeffri A. Kaminski; Venable LLP

(57) ABSTRACT

Systems and methods including receiving, from a merchant system associated with a merchant, a first set of weight values corresponding to websites configured to receive one or more reviews associated with the merchant, determining, based on the first set of weight values, a first set of target distribution values corresponding to the plurality of websites, providing, to a first user system, a first request to provide a first review of the merchant, the first request comprising a first link corresponding to a first website of the plurality of websites, receiving, via an application programming interface associated with the first website, information associated with the first request, providing information associated with the first request, receiving a first updated weight value corresponding to the first web site and a second updated weight value corresponding to a second website of the plurality of websites, identifying, by a container associated with a second request to provide a second review of the merchant, a second website of the plurality of websites based on the second updated weight value, and redirecting, via the container, a web browser of a second user system to
(Continued)

the second website for posting the second review of the merchant.

20 Claims, 10 Drawing Sheets

Related U.S. Application Data continuation of application No. 15/783,186, filed on Oct. 13, 2017, now Pat. No. 11,321,748.

(60) Provisional application No. 62/415,946, filed on Nov. 1, 2016.

(51) Int. Cl.
*G06Q 30/0201* (2023.01)
*H04L 51/046* (2022.01)

(56) References Cited

U.S. PATENT DOCUMENTS

| | | | |
|---|---|---|---|
| 5,956,693 A | 9/1999 | Geerlings | |
| 7,174,306 B1 | 2/2007 | Haseltine | |
| 7,191,448 B2 | 3/2007 | Simpson | |
| 7,552,068 B1 | 6/2009 | Brinkerhoff | |
| 7,664,669 B1 | 2/2010 | Adams | |
| 7,792,952 B2 | 9/2010 | Howard | |
| 7,809,602 B2 | 10/2010 | Nickerson | |
| 7,813,965 B1 | 10/2010 | Robinson | |
| 8,108,255 B1 | 1/2012 | Robinson | |
| 8,140,380 B2 | 3/2012 | Keller | |
| 8,170,958 B1 | 5/2012 | Gremett | |
| 8,255,248 B1 | 8/2012 | Del Favero | |
| 8,433,619 B2 | 4/2013 | Croes | |
| 8,494,973 B1 * | 7/2013 | Dignan | G06Q 10/107 705/14.42 |
| 8,527,631 B1 | 9/2013 | Liang | |
| 8,543,715 B1 | 9/2013 | Rabbat | |
| 8,554,601 B1 | 10/2013 | Marsh | |
| 8,583,031 B2 | 11/2013 | Rao | |
| 8,612,569 B2 | 12/2013 | Douglas | |
| 8,676,596 B1 | 3/2014 | Franson | |
| 8,738,733 B1 | 5/2014 | Walters | |
| 8,819,062 B2 | 8/2014 | Lerman | |
| 8,886,552 B2 | 11/2014 | Finkelstein | |
| 8,943,211 B2 | 1/2015 | Rehfuss | |
| 9,396,490 B1 | 7/2016 | Marx | |
| 9,418,370 B2 * | 8/2016 | Jackson | G06Q 30/0203 |
| 9,824,323 B1 | 11/2017 | Weiss | |
| 10,217,142 B1 | 2/2019 | Chordia | |
| 10,311,124 B1 | 6/2019 | Walters | |
| 10,417,671 B2 | 9/2019 | Berry | |
| 10,445,794 B1 * | 10/2019 | Krishnamurthy | G06Q 50/01 |
| 10,460,328 B2 | 10/2019 | Kapoor | |
| 10,474,979 B1 * | 11/2019 | Piper | G06F 16/24 |
| 11,074,629 B2 | 7/2021 | Berry | |
| 11,321,748 B2 | 5/2022 | Berry | |
| 2002/0184041 A1 | 12/2002 | Muller | |
| 2004/0044563 A1 | 3/2004 | Stein | |
| 2004/0267610 A1 | 12/2004 | Gossett | |
| 2005/0235044 A1 | 10/2005 | Tazuma | |
| 2006/0190475 A1 | 8/2006 | Shi | |
| 2006/0247946 A1 | 11/2006 | Gordon | |
| 2007/0027707 A1 | 2/2007 | Murray | |
| 2007/0078670 A1 | 4/2007 | Dave | |
| 2007/0112735 A1 | 5/2007 | Holloway | |
| 2007/0203738 A1 | 8/2007 | Jaschke | |
| 2007/0282670 A1 | 12/2007 | Repasi | |
| 2008/0071602 A1 | 3/2008 | Ojakaar | |
| 2009/0259956 A1 | 10/2009 | Barsook | |
| 2009/0319342 A1 | 12/2009 | Shilman | |
| 2010/0076968 A1 | 3/2010 | Boyns | |
| 2010/0138271 A1 | 6/2010 | Henkin | |
| 2011/0125796 A1 | 5/2011 | Singh | |
| 2011/0145435 A1 | 6/2011 | Bhatawdekar | |
| 2012/0066233 A1 | 3/2012 | Fonseka | |
| 2012/0130917 A1 | 5/2012 | Forsblom | |
| 2012/0246143 A1 | 9/2012 | Roberts | |
| 2012/0260201 A1 | 10/2012 | Ganesh | |
| 2013/0103600 A1 | 4/2013 | Stibel | |
| 2013/0346172 A1 | 12/2013 | Wu | |
| 2014/0040161 A1 | 2/2014 | Berlin | |
| 2014/0172638 A1 | 6/2014 | El-Hmayssi | |
| 2014/0258169 A1 | 9/2014 | Wong | |
| 2014/0280919 A1 | 9/2014 | Lakes | |
| 2014/0337165 A1 | 11/2014 | Chen | |
| 2015/0170228 A1 | 6/2015 | Wheeler | |
| 2015/0213522 A1 | 7/2015 | Gao | |
| 2015/0310508 A1 | 10/2015 | Pattekar | |
| 2016/0021172 A1 | 1/2016 | Mahadevan | |
| 2016/0162928 A1 * | 6/2016 | Ali | G06Q 30/0282 705/14.4 |
| 2016/0180413 A1 | 6/2016 | Tang | |
| 2016/0217522 A1 | 7/2016 | Jnagal | |
| 2016/0226897 A1 | 8/2016 | Brown | |
| 2016/0267377 A1 | 9/2016 | Pan | |
| 2016/0267505 A1 | 9/2016 | Murphy | |
| 2017/0034127 A1 | 2/2017 | Singleton, IV | |
| 2017/0149708 A1 | 5/2017 | Baumgartner | |

FOREIGN PATENT DOCUMENTS

| | | | | |
|---|---|---|---|---|
| CN | 103778168 A | 5/2014 | | |
| CN | 104487967 A | 4/2015 | | |
| CN | 104867017 A | 8/2015 | | |
| CN | 105046519 A | 11/2015 | | |
| CN | 105612472 A | 5/2016 | | |
| JP | 2011028599 A | 2/2011 | | |
| JP | 2011096078 A | 5/2011 | | |
| JP | 2011221805 A | 11/2011 | | |
| JP | 2013196120 A | 9/2013 | | |
| JP | 2015069398 A | 4/2015 | | |
| KR | 20110058064 A | 6/2011 | | |
| WO | WO-2013166057 A1 * | 11/2013 | | G06F 16/23 |

OTHER PUBLICATIONS

Supplementary European Search Report for EP Application No. EP17868279 dated Mar. 2, 2020, 2 pages.
International Search Report for PCT Patent Application No. PCT/US2017/58894, dated Mar. 1, 2018, 12 pages.
Kshirsagar, Review Analyzer Analysis of Product Reviews on WEKA Classifiers, 2015, 5 pages.
European Office Action for EP Application No. EP17868279 dated Aug. 17, 2021, 9 pages.
Japanese Office Action for JP Application No. JP2019544793 dated Apr. 27, 2021, 3 pages.
Effects of Social Network on Online Reviews (Year: 2015).
Japanese Decision to Grant a Patent in corresponding Japanese Patent Application No. 2019-544793 dated Dec. 7, 2021 (5 pages).
Chinese First Notice of Examination Opinion with Search Report in corresponding Chinese Application No. 201780077838.2 dated Oct. 8, 2022 (9 pages).
Japanese Notice of Reasons for Refusal in corresponding Japanese Application No. 2022-000789 dated Dec. 1, 2022 (8 pages).
Chinese Notice of Grant of Patent Right for Invention in corresponding Chinese Application No. 201780077838.2 dated Feb. 25, 2023 (3 pages).
Japanese Notice of Reasons for Refusal in corresponding Japanese Application No. 2022-000789 dated Jun. 12, 2023 (8 pages).
Japanese Decision to Grant a Patent in corresponding Japanese Patent Application No. 2022-000789 dated Sep. 21, 2023 (5 pages).
European Office Action in corresponding European Application No. 17 868 279.5 dated Nov. 16, 2023 (8 pages).
Non-Final Rejection in corresponding U.S. Appl. No. 18/203,428 mailed Apr. 26, 2024 (18 pages).

* cited by examiner

ONLINE REVIEW GENERATION USING A REDIRECTION CONTAINER

CROSS REFERENCE TO RELATED APPLICATIONS

This application is a continuation of U.S. patent application Ser. No. 17/714,667, filed Apr. 6, 2022, titled "Online Review Generation Using a Redirection Container", which is a continuation of U.S. patent application Ser. No. 15/783,186, filed Oct. 13, 2017, titled "Optimizing Dynamic Third Party Review Generation for Transmitting Redirection Request Links" (now U.S. Pat. No. 11,321,748, issued on May 3, 2022), which in turn claims the benefit of U.S. Provisional Application No. 62/415,946, filed Nov. 1, 2016. The entire disclosures of U.S. patent application Ser. Nos. 17/714,667, 15/783,186, and U.S. Provisional Application No. 62/415,946 are hereby incorporated herein by this reference.

TECHNICAL FIELD

The disclosure relates generally to Internet search impressions technology, and more particularly, to methods and systems for optimizing dynamic third party review generation for transmitting redirection request links.

BACKGROUND

On any particular review website, a review posted may appear in a search engine result related to a particular business that is the subject of the review. To post a review, users typically can access numerous sites using the address of a specific web page on the Internet. Because of the viral nature of the Internet, the reviews and comments are generally user controlled and therefore wide ranging in focus and scope.

BRIEF DESCRIPTION OF THE DRAWINGS

The present disclosure is illustrated by way of example, and not by way of limitation, and can be more fully understood with reference to the following detailed description when considered in connection with the figures as described below.

DETAILED DESCRIPTION

Figure 1:
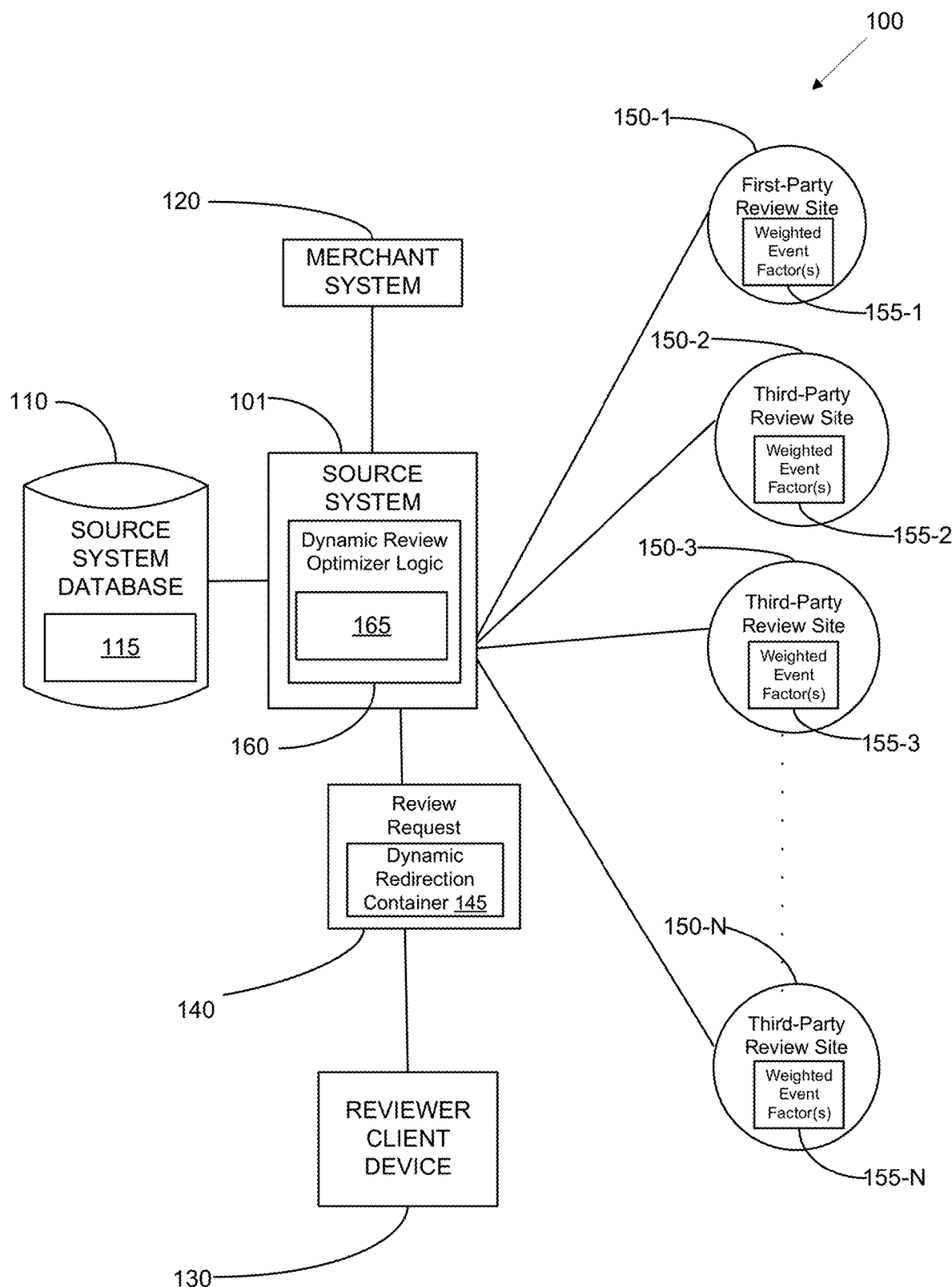
FIG. 1 illustrates an example of a conventional high-level architecture for optimizing dynamic review generation for redirecting request links in accordance with one or more aspects of the disclosure.

Many businesses are increasingly concerned about their online impressions. For example, both positive and negative reviews posted to a review website can impact the business. As more review websites are created on the Internet, and as more users post content to those sites, it is becoming increasingly difficult for businesses to monitor such sites. Further, it can be difficult for businesses to determine whether they need to, and how they can, improve their online impressions to drive traffic to their locations. Additionally, businesses want to increase the number of reviews from their customers as much as possible. Typically, only a minority of customers that visit a merchant post reviews. Businesses are motivated to get their customers to leave as many reviews as possible, and one issue has been ensuring reviews are coordinated in an optimal distribution across the numerous reviewing sites on the Internet.

Methods and systems for creating and distributing dynamic "review requests" are disclosed herein. In one example embodiment, dynamic "review request" links are generated. Each link may dynamically re-route consumers to the optimal website to improve the quality of review data across the Internet. The link could be unbranded, or the link itself could be generated after the optimal review site is determined. By gathering reviews and determining the optimal review site for a review based on several event factors related to a cross section of the reviewing sites, the techniques of the disclosure may ensure that the reviews reflect the most current consumer sentiment about the business. Advantages include: 1) ensuring that there are accurate average ratings across sites; 2) that there are an optimal number of reviews; and 3) that the reviews are recent. An additional advantage of this is that reviews may be distributed in a way to ensure that a business' online impression is consistent across the Internet.

In some implementations, a source system creates a dynamic redirection container, such as a dynamic Uniform Resource Locator (URL) link, that is then transmitted to a user's device to request a review of a business location. For example, the dynamic redirection container may be, but not limited to a computer readable object comprising dynamic URL, text message or other types of controls for redirecting the display of a user's client device to a particular Internet resource. The request may be sent on behalf of a merchant in response to detecting a condition associated with the user. These conditions may include the user entering/leaving the merchant's location, a purchase by the user related to the merchant, the browsing history of the user, or other types of conditions.

An existing distribution of reviews for the business across a plurality of review sites is monitored. For example, an apparatus (e.g., a web crawler) may be used to crawl through review and rating sites on the Internet. In another embodiment, the access may be through one or more APIs, but also may be through scraping, JavaScript or any other method of pulling data from such sites. The analytics and data associated with these pre-existing reviews may be used as part of the algorithm implemented in the dynamic review optimizer described below.

The apparatus accesses data from the web and stores this data in a database. In some implementations, review data may be accessed from a source system associated with the merchant. If the user decides to provide a review of the merchant by selecting the dynamic redirection container, a determination is made as to whether the existing distribution of reviews across the review sites correctly quantifies current consumer sentiment about the business. For example, based on several weighted event factors, the user is redirected to a review site to optimize the benefit of that review to the merchant.

In some implementations, once a review is generated through the dynamic redirection container that review may be pulled back into the source system so that it can be monitored with other review currently being monitored. For example, the reviews are "flagged" or otherwise tagged to indicate that the reviews originated from the dynamic review generation dynamic redirection container. The source system can then either automatically or manually update the dynamic review generation algorithm based on how the monitored reviews are meeting the desired optimization parameters specified by the merchant via the weighted event factors.

In alternative implementations, the source system may detect if the reviewer is logged into a particular reviewing site. At this point, the dynamic redirection container may use the weighted event factors to select sites with the highest weighting and then direct the reviewer to a site if they are already logged onto that site. In that regards, the possible destination sites may or may not be for reviews, ads, etc.

FIG. 1 illustrates an example of a conventional high-level architecture 100 for optimizing dynamic review generation in accordance with implementations of the disclosure. In some implementations, the architecture includes a central computer (hereinafter "the source system 101") that may include a memory device (not shown) storing a plurality of software modules to implement dynamic review optimizer logic 160. The dynamic review optimizer logic 160 may be, for example, a hardware component, circuitry, dedicated logic, programmable logic, microcode, etc., that may be implemented in a processing device (not shown) of the source system 101.

The source system 101 may be communicatively connected with a merchant system 120, potential reviewers via reviewer client devices 130 (e.g., a mobile phone), a plurality of impression sources (e.g., reviewing sites) 150-1 through N, and a source system database 110. In one implementation, the software modules may be executed on one or more computer platforms of the source system 101 that are interconnected by one or more networks, which may include the Internet. Each of the reviewing sites 150-1 through N provides a plurality of modules (e.g., APIs) with which the source system 101 interacts for carrying out operations and providing relevant data between the source system 101, the merchant system 120 and the reviewer client devices 130.

In this example, the source system 101 allows merchants associated with the merchant systems 120 to collect, analyze, and monitor consumer feedback data (e.g., reviews/rating etc.) and other types of data from a variety of sources, including first-party reviewing websites (e.g., the merchant's own website or a service provider's website on the merchant's behalf), third-party reviewing websites (e.g., social networking and rating websites), and other sources. A first-party reviewing website 150-1 may refer to a website maintained by the merchant that is collecting reviews for themselves versus a third-party reviewing website 150-2 through N, such as Google™, Facebook™, Yelp™, Citysearch™ and so on, that collect reviews of various merchants. In some implementation, an online forum may also be an example of other types of websites that can contain consumer feedback data (e.g., reviews) regarding a business. In one implementation, the reviewing sites 150-1 through N allow reviewers (e.g., via their client devices 130) to post reviews regarding all types of businesses.

In order to access the services of the source system 101 of FIG. 1, the merchant system 120 may register for an account with the source system 101. In some implementations, merchants may access an API associated with the source system 101 to enter specific information that may correspond to their business profiles on reviewing sites 150-1 through N. In other implementations, the merchants may access the source system directly, a web platform or other means. This business profiles information 115, may be stored and include, for example, a business name, address, telephone number, a link to a website for the business, a pointer to a map of the location of the business, the business location on a map, a promotional message for the business, and a list of information regarding personal and product offerings of the business, which may include, but not limited to, menus, products services, upcoming and past events, etc. In other implementations, merchants 120 may access pre-existing reviews from one or more First-Party Review Sites and/or Third-Party Review Sites 150-1 through N. The access may be through one or more APIs, but also may be through scraping, JavaScript or any other method of pulling data from such sites. The analytics and data associated with these pre-existing reviews may be used as part of the algorithm implemented in the source system 101 as implemented by the dynamic review optimizer 160 described below.

A process of collecting consumer-feedback data (e.g., reviews) for a merchant may be initiated in several ways. For example, the source system 101 may transmit a review request 140 to the reviewer client device 130 of a potential reviewer. In some implementations, the review request 140 may be transmitted via an electronic communication (although other transmission technologies are possible such as text messages, app-push notifications, including the request in a printed receipt received by the reviewer, add the request to an e-commerce cart, etc.). The source system 101 may receive a list of potential reviewers, for example, from the merchant system 120. In some implementations, this list may be received in response to detecting that the reviewer has entered or exited a location associated with the merchant. For example, social networking sites allow reviewers to take actions such as "checking in" to a location. The merchant system 120 may detect this action and instruct the source system 101 to transmit a review request 140 to the reviewer's client device 130. In other implementations, the review request 140 may be sent to the reviewer's client device 130 based on a purchase or browsing history by a potential reviewer regarding the merchant or other types of reviewer profile information collected by the merchant. In another implementation a merchant may manually select one or more potential reviews and have the source system send review requests to such selected potential reviewers.

The merchant system 120 may identify potential reviewers and when to send review requests 140 to those reviewers. This may be activated soon after the reviewer has had an experience at one of the locations associated with the merchant. For example, the reviewer may have performed a check out at a physical store location and then gets an email at a determined time (e.g., 5, 10, 15 minutes) later requesting the reviewer to review that store. In another example, review requests 140 could be sent based on other factors involving time. In one implementation, a certain number of review requests 140 could be sent. If in a certain time frame, the reviews generated fall below a certain threshold, additional review requests 140 could be sent at a later time. In another implementation, one could rate limit the review requests 140 sent. In one implementation, the review request 140 may request the reviewer to provide a review of the physical location of the merchant. The source system 101 allows the merchant to observe the history related to the emailed review requests. For example, the request history may be stored in the system database 110 in a data table, such as in object 115. In some implementations, the data table may include, but not limited to, the following columns:

| Column | Contents |
| --- | --- |
| Email | The email address of the contact |
| Name | The first and last name of the contact. |
| Location | Standard location information. |
| Delivered | The date time the email was delivered. If the email failed to deliver, instead this shall display an error icon and status.<br>Statuses:<br>Bounced |
| Opened | The date time the email was first opened. |
| Clicked | The date time the link in the email was first clicked. |
| Site | The site the reviewer was directed to when they clicked the link. |
| Reviewed | The date time of the review attributed to this email. |
| Last Action Taken | All, Delivered, Opened, Clicked, Reviewed |

The review request 140 may include a dynamic redirection container 145 link for a reviewer to activate the reviewing process. For example, the dynamic redirection container 145 may automatically redirect the reviewer's client device to one site over another whether it is a first party reviewing site or a third party reviewing site. The dynamic redirection container 145 redirects the client device based on an algorithm implemented in the dynamic review optimizer logic 160, which takes into account several weighted event factors 155-1 through N associated with the reviewing sites 150-1 through N. In one embodiment, the event factors 155-1-N may be stored locally, for example, in a table 115 of the source system database 110. In some embodiments, the table 115 may be indexed by using an identifier for a particular 150-1 through N, to identify corresponding event factors 155-1 through N for that site. The dynamic review optimizer logic 160 is activated when a reviewer clicks on the link indicating that they wish to provide a review. Then, all of the information associated with the weighted event factors 155-1 through N is analyzed to determine a redirection list 165 of sites. This redirection list 165 may be used to determine to where the reviewer should be directed to provide the review. An advantage of using the dynamic redirection container 145 to redirect the client device is that it allows different delivery mechanisms to be used to transmit the review request 140. For example, the dynamic container may be transmitted via text message. In addition, the dynamic redirection container 145 allows the system to dynamically determine the site to direct reviewers based on the factors that may change from the time the link was sent and at the time the reviewer clicks the link.

In other implementations other aspects of the review request 140 may be dynamically generated at various stages of the system and method. For example, an email, text message or other transmission technology may be dynamically generated instead of the dynamic redirection container itself. In one embodiment, as soon as a reviewer has an experience at a location associated with a merchant, an email may be automatically and dynamically generated based on an analysis of the plurality of weighted factors. The email or other transmission technology may be adjusted based on the Review Site picked to direct the reviewer to. For example, if Site A is chosen as the optimal review site, the email's branding or design may be created to match the branding or design of Site A. In another embodiment, a merchant may manually choose reviewers to send the review request to. The email, text message or other communication technology may be generated at this point dynamically, for example, from the source system 101 or Site A (such as one of the online third party review sites 150-2 through N) which can be triggered to generate a reviewing object 145 to transmit to the client device 130. In other embodiments, instead of a URL, frames, inline links, dynamic HTML, client-side scripting, AJAX, CSS or other means of providing access to a Third Party Review Site 150-2 through N may be used to provide a reviewer with the ability to leave a review.

If the potential reviewer clicks the dynamic redirection container 145 to post a review, the source system 101 may receive a selection indicator. Thereupon, the source system 101 as directed by the dynamic review optimizer logic 160 may pull in existing review statistics about the merchant's location on a variety of sites. In another implementation, these review statistics may have already been collected by the dynamic review optimizer logic 160 that then evaluates or analyzes such collected statistics at this time. Based on some set up by the merchant system 120 and their existing distribution of reviews across those sites, the source system 101 may dynamically decide which site to send that reviewer. This may include a site associated with the source system 101 that collects first-party reviews for the merchant.

A plurality of weighted event factors 155-1 through N associated with one or more sites 150-1 through N is analyzed based on the selection and input from the merchant. In some implementations, a web crawler is provided to crawl review sites and rating sites of the web. In this regard, existing review statistics about the merchant's location are pulled from a variety of sites. The web crawler may identify links to other review sites and ratings sites of the data from the Internet. In some implementation, all of the sites identified by the web crawler are monitored. In other implementations, the merchant may choose which sites they want reviews to be monitored and analyzed. In one implementation pre-existing reviews are monitored from the one or more review sites 150-1 through N through API connections. In other implementations, this data may be scraped, collected via JavaScript or any other mechanism and tools to collect review information from the review sites 150-1 through N. Based on the analysis of the weighted event factors 155-1 through N, the dynamic review optimizer logic 160 redirects the client device to at least one or the reviewing sites from the redirection list 145 for the reviewer to place a review of the merchant.

The weighted event factors 155-1 through N are considered in determining which site 150-1 through N to direct the potential reviewer's device 130 for placing a review. In some implementations, the merchant via the merchant's system 120 may adjust the weight given to any factor over another factor. The merchant 120 may be provided with an interface control for the source system 101 to manipulate parameters for using any of the event factors 155-1 through N used to determine which site to direct a potential reviewer. These adjustable event factors 155-1 through N may include, but not limited to:

Knowledge about the potential reviewers
Location of the reviewing site
Amount of traffic at the reviewing site
Recency of the review
Statistical data regarding a particular reviewing site
External information regarding the merchant
Merchant reviewing site preferences
Other Factors Knowledge about the Potential Reviewers In this example, information collected about specific reviewers associated with the reviewer client device 130 may also be used. For example, the frequency for which a specific reviewer leaves reviews on specific sites may be considered. If a user leaves reviews on Site A more than Site B, (or is a super user of Site A) the merchant may want to send the reviewer to site A. Additionally, knowledge of a particular user's affiliation with a specific site may be relevant. For example, if it is known that a reviewer is already logged into Site B, that reviewer may be more likely to leave a review on Site B than another site. In another example, if a reviewer is known to leave fake or otherwise objectionable reviews, that user may be flagged. In some instances, the email wouldn't send to such reviewer if the algorithm determines that the reviewer leaves fake reviews.

The information about the potential reviewers may also include reviewer profile information received from the reviewer client device 130. In some implementations, this reviewer profile information may indicate certain factors regarding the reviewer that makes it more likely that the reviewer may use one site of the sites 150-1 through N over another site. This may indicate how likely the potential reviewer is to complete a review at a particular site, for example, based on past reviews posted by the reviewer at that site.

Location of the Reviewing Site

With regards to this factor, the location of the reviewing site 150-1 though N may refer to sites that the merchant expects consumers to discover them at. These can be popular sites or sites directed to a subject matter associated with the merchant.

The Amount of Traffic at the Reviewing Site

The amount of traffic at a particular one of the reviewing sites 150-1 though N may refer to a threshold number (set by the merchant) of customers that must visit a particular reviewing site before the merchant wants review request to be directed to that site. This may indicate a site where customers frequently seek information about the merchants. In some implementations, the traffic to the reviewing site may be below a certain threshold. For example, the merchant on one site may have 1,000 reviews with an average rating of 3.6, and on another site the merchant may have 10 reviews with an average is 2.4. In this example, the system may send more reviewing traffic to the site with 10 reviews in order to raise the aggregate rating for that site.

Recency of the Review

The recency of the last review on a particular one of the reviewing sites 150-1 though N may refer to a merchant's desire to have a concentration of new reviews at a particular reviewing cite to optimize a rating for the merchant at that site. In some implementations, the merchant may indicate its desire to make sure certain reviewing sites have the most recent reviews to scale reviews at the site from a consumer point of view. In some implementations, the merchant can define the most recent reviews as reviews occurring in the last month or some other type of time indicator. In one illustrative example, if a number of reviewers are being sent to other sites for various reasons and a particular site has not received a review in the last month, the system may want to send all recent reviewers to the site.

Statistical Data Regarding a Particular Reviewing Site

Statistical data regarding the reviewing sites 150-1 through N may be used as a factor in determining which site to direct potential reviewers. For example, a merchant may have received a rating of three-and-a-half (3.5) stars at a certain website and two-and-a-half (2.5) stars at other sites. The dynamic review optimizer may analyze where consumers are leaving reviews and determine an aggregate rating of the merchant across the sites. The dynamic review optimizer may then determine a statistical deviation level based on the data and determine if the ratings on a particular site is outside of a normal level. In this example, more reviewers may be directed to a particular site because if enough reviewers are sent there the rating may raise to a normal level regardless of whether the reviews are positive or negative. For example, if out of 1,000 reviews on one site the average is 3.5, but there are only 10 reviews on the other site with the 2.5 average, by building up the reviewers to 1,000 people this may raise the overall aggregate rating on that site to 3.5 like in the other site.

In some implementations, the dynamic review optimizer logic 160 may reduce the generation of review requests 140 for the site with more reviews to test the impact of the reviews on the aggregate rating for the merchant on that site. In this regard, the dynamic review optimizer may use data signals adjust the rating across multiple sites. For example, the merchant may want a 50/50 split of reviews across multiple reviewing sites. Over time the system may adjust the direction of the reviews based on other factors like the entry mechanism for reviews on one site may be easier than another. Thus, the source system 101 may intuitively learn from the data signals to adjust the split that sends reviewers to a site to generate desirable ratio of reviews across sites.

External Information Regarding the Merchant

Any outlying external factor regarding the merchant may be used as a factor to determining which of the sites 150-1 through N to direct potential reviewers. For example, if there is some change at the merchant's location that would cause one review site to have low reviews, such as a change in a health code score from an "A" to a "C" for the merchant. This information may be retrieved, for example, from a ratings database from the Department of Health or other sources. The dynamic review optimizer may predict how this external information is going to impact ratings. In such a situation, traffic may be directed to the merchant's first party reviewing site rather than a third party reviewing site to better understand how the company is being presented during the time the merchant's location is impacted. In other situations, requests for reviews may not be set at all to not adversely impact the Merchant's ratings.

Merchant Reviewing Site Preferences

In some implementations, the merchant may indicate their desire for reviews to be on a particular site of the plurality of sites 150-1 through N. As such, the distribution of reviews may be adjusted so that certain site receives more reviews than others. In some situations, the merchant may prefer for the reviews to be on their first-party site rather than a third-party site because on the third party sites the merchant has less control on how reviews are filtered. In some situations, the merchant may want to push low rating reviews off of a front page of a reviewing website by pushing more positive reviews. For example, it is common with reviewing sites to show a number of reviews (e.g., five) and then there is a paging function to click to the next page to see more reviews. Some merchants may have a preference that if there is a one star review in the last five reviews, the dynamic review optimizer may send more people to the reviewing site so as to push that one-star review to the second or latter page. Thus, the higher rated reviews are the first thing someone sees if they go to that reviewing website.

In one illustrative example, the merchant may configure the dynamic review optimizer logic 165 for certain reviewing sites and apply a weighting for each site. First, the merchant may add a number of sites for sending review requests and then adjust a ratio for each site. In some implementations, the merchant may choose one or more options related to this ratio, such as avoid 1-star reviews in the five most recent first party reviews or matching logged in reviewers to sites. The merchant may then save these options so that the dynamic review optimizer may use the options to decide on how to route reviews when a reviewer clicks on a link associated with a review request.

In some implementations, the method and system may also be used to generate review requests 140 for other types of information instead of just reviews. For example, a merchant may be able to use a dynamic redirection container 145 or other mechanism to dynamically direct a customer to a website to check to ensure if the location data of such merchant is correct on such site. In another example, the techniques of the present disclosure may dynamically send a customer to a location-specific site based on a variety of weighted factors. In another implementation, instead of generating a request, a merchant may be able to use the weighted factors to generate an email specific to a location of a merchant most directly applicable to such customer.

Figure 2:
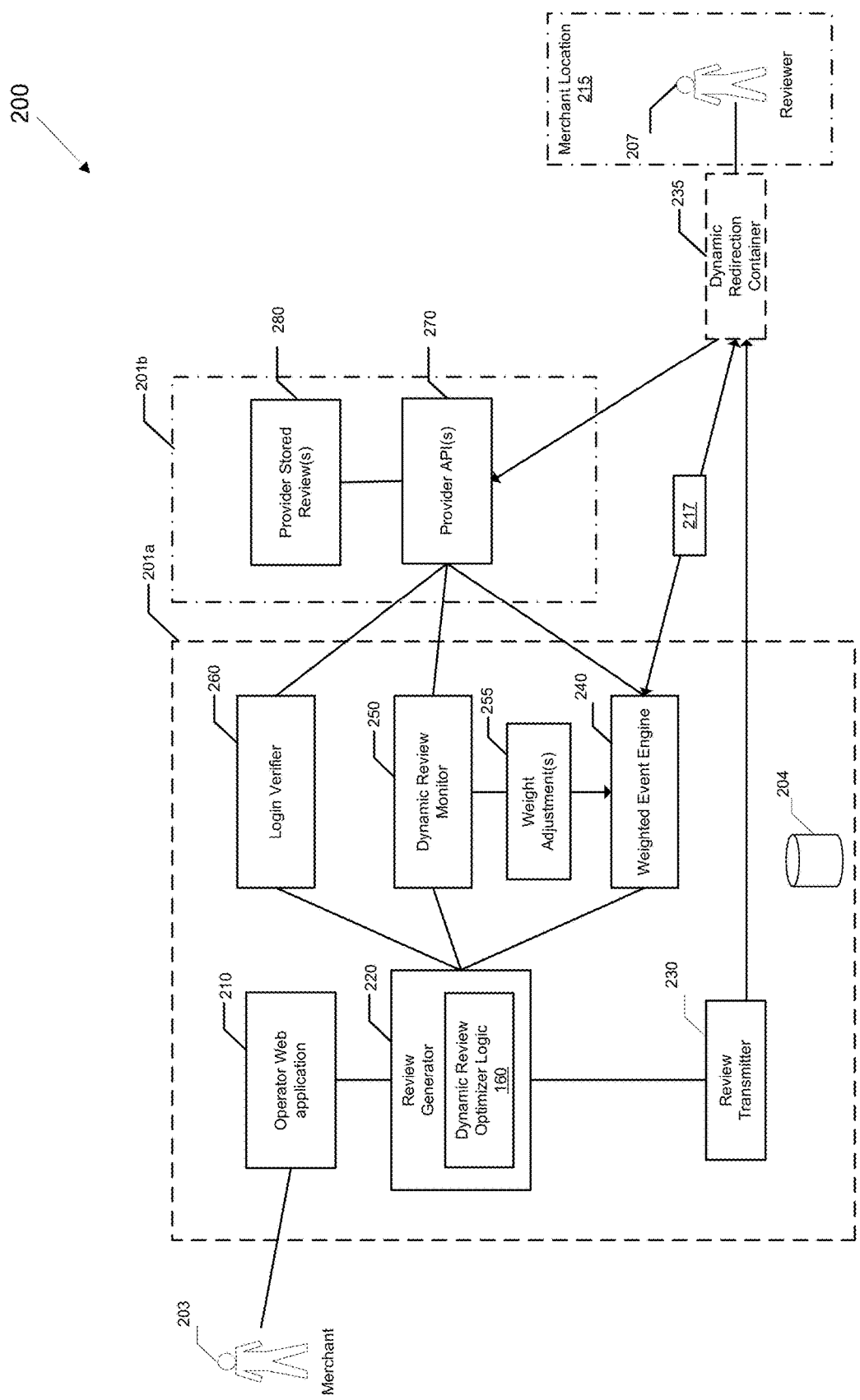
FIG. 2 illustrates is an example system including memory for optimizing dynamic review generation for redirecting request links in accordance with one or more aspects of the disclosure.

FIG. 2 illustrates is an example system 200 including memory 204 for optimizing dynamic review generation in accordance with one or more aspects of the disclosure. The system 200 may be executed on one or more computer platforms interconnected by one or more networks, which may include the Internet. In some embodiments, memory 204 may a system database (such as database 110), or a storage system comprising the system database. A central computer platform (hereinafter "the source system 201*a*") includes a system database 204 and a plurality of software modules 210, 220, 230, 240, 250 and 260 that are communicatively connected with one or more merchants 203, and a plurality of service provider computer platforms (hereinafter "the service provider system(s) 201*b*").

Each of the service provider computer platforms 201*b* provides a plurality of modules 270, 280 with which the source system 201*a* interacts for carrying out operations and providing provider stored reviews data 280 between the source system 201*a* and the service provider computer platforms 201*b* regarding posted reviews from, for example, a potential reviewer 207 at a physical merchant location 215. Although reviewer 207 is shown in FIG. 2 at the merchant location 215, the reviewer 207 may be at another location not associated with the merchant 203 when providing reviews about the merchant 203.

The system 200 allows the merchants 203 to collect, analyze, and monitor consumer feedback data (e.g., reviews/rating etc.) and other types of data from a variety of sources including the service provider computer platforms 201*b* (e.g., the merchant's own website or a service provider's website on the merchant's behalf) to achieve an optimal distribution of reviews across the numerous reviewing sites. The source system 201*a* may receive a list of potential reviewers, such as reviewer 207. In some implementations, this list may be received in response to detecting that the reviewer 207 has entered or exited the merchant location 215. For example, social networking sites allow reviewers to take actions such as "checking in" to a location. In other implementations, the list of potential reviewers may be based on a purchase or browsing history by the reviewer 207 regarding the merchant 203 or other types of reviewer profile information collected by the merchant 203. In another implementation, the merchant 203 may manually select one or more potential reviews for the source system 201*a* to send review requests to such to reviewer 207.

To access the services of the system 200, the merchant 203 may be provided with an operator web application 210. The operator web application 210 allows the merchant 203 to review, develop and adjust an algorithm used for determining where the reviewer 207 should be directed to provide the review. In this regard, the operator web application 210 may allow the merchant 203 to input several types of distribution parameters for optimizing the distribution of reviews. These distribution parameters may include, for example, weighted values assigned to certain reviewing sites, a number of review requests to send during a given time period, timing for the review requests, a target distribution of reviews to store at each site, recency of the reviews as well as other distribution parameters to balance and optimize a distribution of the reviews. Further aspects of the operator web application 210 as discussed with respect to FIGS. 4A, 4B, 5A and 5B.

With respect to FIG. 2, the system 200 includes a review generator 220. The review generator 220 may implement the dynamic review optimizer logic 160 of FIG. 1. The dynamic review generator 220 takes into account several weighted event factors associated with the reviewing sites of the service provider computer platforms 201*b* and the distribution parameters specified by the merchant 203 via the operator web application 210. Based on this information, the dynamic review generator 220 generates a dynamic redirection container 235 link for a reviewer 207 to activate the reviewing process. For example, the dynamic redirection container 235 redirection container 235 may automatically redirect the reviewer's 207 client device to one site over another site associated with the service provider computer platforms 201*b*.

The dynamic review generator 220 may instruct the review transmitter 230 to transmit the dynamic redirection container 235 to reviewer 207 via their client device. The review transmitter 230 may transmit the dynamic redirection container 235 in, for example, a review request using several types of techniques. For example, the dynamic redirection container 235 may be transmitted via an electronic communication, such as a text message, email, app-push notifications, etc. In other implementations, the dynamic redirection container 235 may be transmitted in a printed receipt received by the reviewer 207 or added to an online cart, etc.

If the reviewer 207 clicks on or enter the dynamic redirection container 235 into their client device to post a review, the source system 201a may receive a selection indicator 217. This selection indicator 217 may include relevant data regarding the reviewer 235, such as browsing history, location, purchasing history as well as other relevant information of the reviewer 235. The source system 201a may then instruct the weighted event engine 240 to pull in existing review statistics about the merchant's location on a variety of sites associated with the service provider computer platforms 201b. In another implementation, the weighted event engine 240 may have already been collected review statistics from the sites of the provider computer platforms 201b then evaluates or analyzes such collected statistics. In this regard, the weighted event engine 240 may access specific provider application program interfaces (APIs) 270 to collected review statistics regarding provider reviews 280 stored at the service provider computer platforms 201b. In another implementation, the review statistics may be stored in the source system 201a database 204 or another database.

The weighted event engine 240 elevates the collected review statistics and information from the review generator regarding the merchant's specified distribution parameters to identify or otherwise produce a plurality of weighted event factors for each of the sites in the service provider computer platforms 201b. The weighted event factors relate to a cross section of the reviewing sites to ensure that the reviews reflect the most current consumer sentiment about the merchant 203. In accordance with the weighted event factors, the weighted event engine 240 redirects the reviewer's client device to at least one site of sites API 270 to be perceived by the reviewer 207 as being associated with the dynamic redirection container 235. In some implementations, the weighted event engine 240 may produce a redirection list that lists the potential sites, URLs, or other network address to redirect the reviewer's client device. This redirection list may be stored, for example, in a database of memory 204. Based on the weighted event factors for each site, the weighted event engine 240 may then select a site view the provider APIs to redirect the reviewer 207 so that they can place a review at that site associated with the service provider computer platforms 201b.

Several different weighted event factors may be used to determine where the reviewer's client device will be redirected. For example, if the weighted event factor for a particular site in below a certain threshold value, the reviewer's client device may be redirected to that site (e.g., to a provider API 270) so that reviews on the site can meet the threshold. This threshold value may represent, for example, a target distribution of reviews that the merchant' desires to be stored at the site based on present reviews stored thereon. In some implementations, a client device of the reviewer 207 may be redirected to a particular site if it is determined that the weighted event factor that site meets a recency of reviews for the merchant stored thereon. In some implementations, if it is determined that the weighted event factor for the site is below a target review rating for the merchant, the reviewer 207 may be redirected to the site. In other implementations, if it is determined that the weighted event factor for the site meets a priority indicator specified by the merchant 203 in the distribution parameters, the reviewer 207 may be redirected to the site to place a review. This may indicate the merchant's 203 preferences for reviews to be placed at a certain site over other sites associated with the service provider computer platforms 201b.

Once a review is generated through the dynamic redirection container 235 that review may be pulled back into the source system 201a so that the dynamic review monitor 250 can monitor it with other reviews currently being monitored. For example, the dynamic review monitor 250 may retrieve the provider stored review data 280 via the provider API 270. The review data left by the reviewer 207 may be located based on identifying information associated with the reviewer 207 that was transmitted to the source system 201a via the selection indicator 217. In other implementations, the review data may include a specific flag or marker when it is generated based on the dynamic redirection container 235 transmitted to the client device 207.

Once the reviews are "flagged" or otherwise tagged to indicate that the reviews ordinated from the dynamic review generation dynamic URL, the dynamic review monitor 250 can then either automatically or manually update the review generator 220 based on how the monitored reviews are meeting the desired optimization (e.g., distribution parameters specified by the merchant 203. For example, the dynamic review monitor 250 may transmit weight adjustments 255 or otherwise update the weighted event factors generated by the weighed event engine to take into account the monitored reviews. For example, the weight adjustments 255 may increase or decrease the weighted value given to certain weighted event factors.

In some implementations, the source system 201a may detect if the reviewer 207 is already logged into a particular reviewing site, such as the merchant's site or a third party reviewing site. For example, the login verifier 260 may access the provider API(s) 270 to determine whether the reviewer 207 is currently logged in. In some embodiments, the login verifier 260 may examine the browsing history of the reviewer 207 received in the selection indicator 217 to determine whether the reviewer 207 is logged into or has recently logged into a particular site. At this point, the login verifier 260 may instruct the review generator 220 to use the weighted event factors to select sites with the highest weighting and then redirect the reviewer 207 via the dynamic redirection container 235 to a particular site if they are already logged onto that site.

Figure 3:
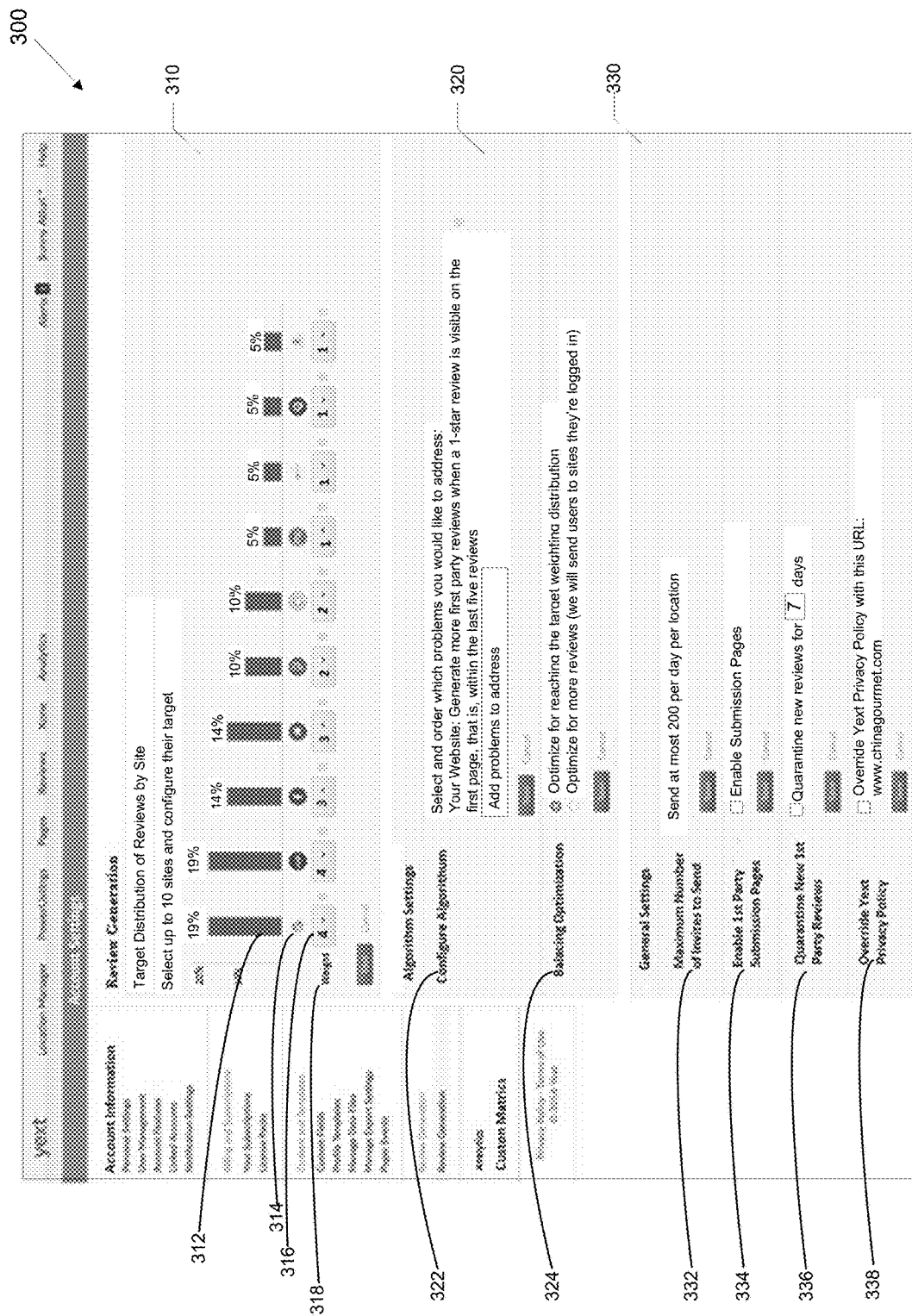
FIG. 3 illustrates an example interface portal to support optimizing dynamic review generation for redirecting request links in accordance with one or more aspects of the disclosure.

FIG. 3 illustrates an example interface portal 300 to support optimizing dynamic review generation for redirecting request in accordance with one or more aspects of the disclosure. In some implementations, the interface portal 300 may correspond to a portal of the operator Web application 210 of FIG. 2. The interface portal 300 provides an example interface in which merchants, such as merchant 203, can develop and adjust an algorithm used for determining where the reviewer, such as reviewer 207, should be directed to provide the review. In this regard, the operator web application 210 may allow the merchant to input several types of distribution parameters for optimizing the distribution of reviews. These distribution parameters may include, for example, weighted values assigned to certain reviewing sites, a number of review requests to send during a given time period, timing for the review requests, a target distribution of reviews to store at each site, recency of the reviews as well as other distribution parameters to balance and optimize a distribution of the reviews.

in some implementations, the interface portal 300 may include several panels that include a review generation panel 310, an algorithm settings panel 320 and a general settings panel 330. The review generation panel 310 displays the target distribution 312 of reviews for the merchant by site 314. This may include an assigned weight value 316 given to each site as specified by the merchant. For example, the weight 318 may be a value between a certain range (e.g., 1-5) where lower value weights are given less preference for distributing reviews to than to higher value weighted sites. The algorithm settings panel 320 allows the merchant to configure the algorithm 322 and balancing optimization of settings used for the targeted distribution 312. The general settings 330 allows the merchant to set distribution parameters which include, but not limited to, a maximum number of review request to send 332, enabling $1^{st}$ party (e.g., merchant) submission pages 334, quarantine new $1^{st}$ party reviews 336 and override privacy policy rules 338.

Figure 4A:
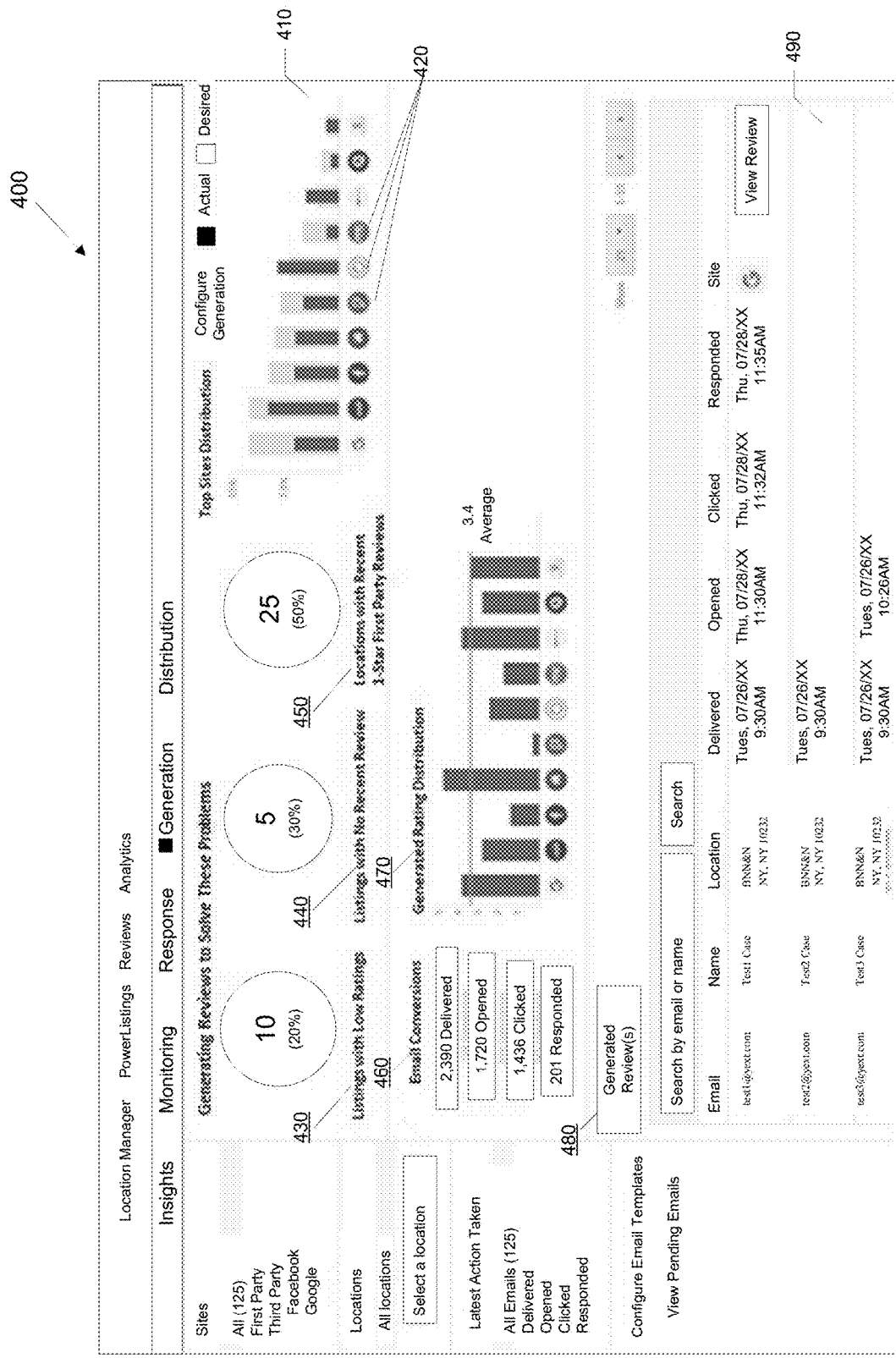
FIG. 4A illustrates an example dashboard portal to support optimizing dynamic review generation for redirecting request links in accordance with one or more aspects of the disclosure.

With respect to FIG. 4A, an example dashboard interface 400 is shown. In some implementations, the interface portal 300 may correspond to a portal of the operator Web application 210 of FIG. 2. The dashboard interface 400 provides an example interface in which merchants, such as merchant 203, can review the results of generating reviews to solve various problems specified by the merchant, such as merchant 203, for optimizing the distribution of reviews. In some implementations, the dashboard interface 400 may display certain results, such as top sites distribution graph 410 for specified sites 420, displaying the listings with low ratings 430, listings with no recent reviews 440, and locations with recent 1-star first party reviews 450. Based on the results, the merchants can update settings for the generated rating distribution 470. In some implementations, the dashboard interface 400 may also provide the merchants with way to monitor reviews generated through the dynamic redirection container 235. For example, the reviews may be pulled back into the source system 201a and displayed in a generated review panel 480 of the dashboard interface 400. Advantages of the generated review panel 480 is that is allows the merchant to monitor certain reviews 490 along with other reviews generated through the dynamic redirection container 235.

Figure 4B:
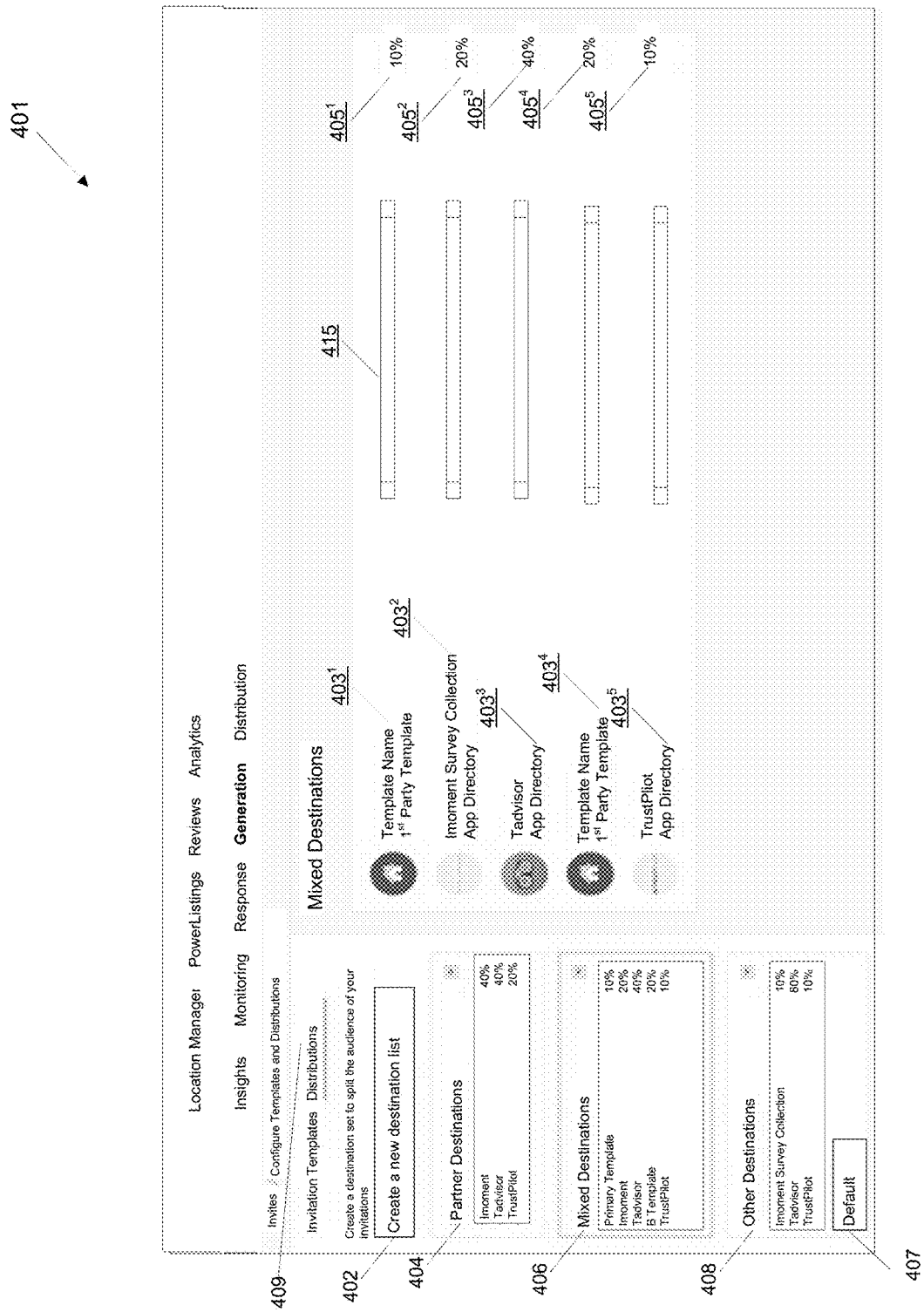
FIG. 4B illustrates an example portal to support optimizing dynamic third party review generation for transmitting redirection request links in accordance with one or more aspects of the disclosure.

With respect to FIG. 4B, an example portal 401 to support optimizing dynamic third party review generation for transmitting redirection request links is shown. In some implementations, the portal 401 may correspond to a portal of the operator Web application 210 of FIG. 2. The portal 401 provides an example interface in which merchants, such as merchant 203, may determine how to allocate one or more review requests by creating one or more distributions 409 (e.g., distribution parameters) to generate and transmit one or more review requests to a potential reviewer's client device. For example, the merchant 203 may activate a control 402 to create a new distribution 409. In some implementations, a distribution 409 may be created for each location associated with the merchant 203. In other implementations, the merchant 203 activates a second control 407 to set a default distribution for an account of the merchant 203. In other implementations, the portal 401 may include a location edit control that allows the user to set a default distribution for the location of the merchant 203. The distributions 409 may include a first party destination site (such as site associated with the source system 201a), one or more partner destination sites 404 (such as registered data partner of the source system 201a), other type of destination sites 408 or any combination of the three types thereof.

In some implementations, the distributions 409 are used to balance a distribution of online reviews for the merchant 203 by indicating which site to trigger to send a review invitation to a potential or set of reviewers. For example, the merchant 203 may chose weights $405^{1-5}$ for each destination $403^{1-5}$ where the weights $405^{1-5}$ indicate a percentage distribution of reviews per destination site. The weights $405^{1-5}$ may be assigned by using a slider 415 or manually typing in a percentage into the operator web application. The slider 415 can be implemented with keyboard controls (for example, by pressing the left/right arrows to increment a corresponding percentage increase or decrease in the weights $405^{1-5}$. In response to adding or removing a destination from a distribution set, the portal 401 may reallocate that destination's percentage to equally amongst the other destinations. If the total percentage of the destinations in a particular distribution does not equal 100 percent, the portal 410 may generate an error when the set is saved. In other implementations, weighted event factors 155-1 through N may be used to determine which destination 403 should be sent the review request.

Figure 5A:
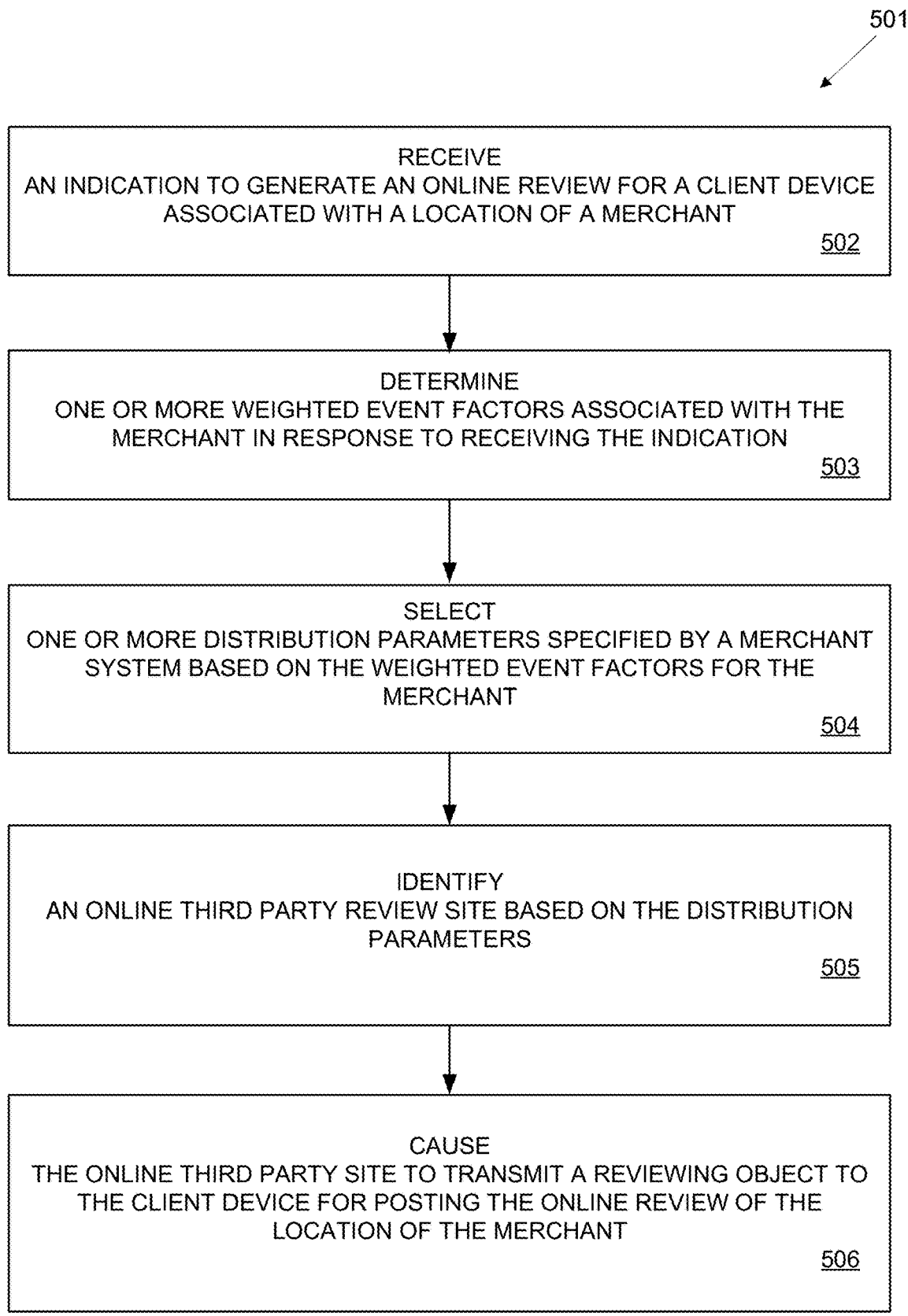
FIG. 5A illustrates a flow diagram of a method for optimizing dynamic third party review generation for transmitting redirection request links in accordance with one or more aspects of the disclosure.

FIG. 5A a flow diagram of a method 501 in accordance with one or more aspects of the disclosure. In one implementation, processing device 201a of FIG. 2 as executed by the dynamic review optimizer logic 160 of FIG. 1 may perform method 501 to optimize dynamic review generation for redirecting request links or to transmit a reviewing object 235. The method 501 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 501 and each of its individual functions. In certain implementations, a single processing thread may perform method 501. Alternatively, two or more processing threads with each thread executing one or more individual functions, routines, subroutines, or operations may perform method 501. It should be noted that blocks of method 501 depicted in FIG. 5A can be performed simultaneously or in a different order than that depicted.

Referring to FIG. 5A, at block 502, method 501 receives an indication to generate an online review for a client device 130 associated with a location 215 of a merchant 203. For example, this indication may include a list of client devices (e.g., client device 130) of reviewers 207 that have entered or exited a location 215 associated with a merchant 203. In some implementations, the indications may come from a social networking site that allows a reviewer 207 to take an action such as "checking in" to a location. The merchant system 120 may detect this action or receive a signal from the social networking site. In other implementations, the indication may be based on a purchase or browsing history by a potential reviewer regarding the merchant or other types of reviewer profile information collected by the merchant 203. In other implementations merchant 203 may choose the one or more client devices 130, and the indication may be such choice itself.

In block 503, one or more weighted event factors associated with the merchant are determined in response to receiving the indication. For example, a plurality of weighted event factors 155-1 through N associated with one or more sites 150-1 through N that include third-party websites are identified. In one embodiment, the event factors 155-1-N may be stored locally, for example, in a table 115 of the source system database 110. The weighted event factors 155-1 through N are considered in determining which site 150-1 through N to direct the potential reviewer's device 130 for placing a review. In some implementations, the merchant via the merchant's system 120 may adjust the weight given to any factor over another factor. The merchant 120 may be provided with an interface control for the source system 101 to manipulate parameters for using any of the event factors 155-1 through N used to determine which site to direct a potential reviewer.

One or more distribution parameters specified by a merchant system are selected in block 504 based on the weighted event factors for the merchant. For example, distribution parameters are used to balance and optimize a distribution of online reviews for the merchant. Based on some distribution parameters set up by the merchant system 120 and their existing distribution of reviews across those sites, the source system 101 may dynamically decide which site to trigger to send a review invitation to that reviewer. In some implementations, an operator web application 210 may allow the merchant 203 to input and adjust several types of distribution parameters for optimizing the distribution of reviews. For example, the merchant 203 may chose weights for each destination by using a slider or manually typing in a percentage into the operator web application.

An online third party review site is identified by block 506 based on the distribution parameters. For example, the distribution parameters are used to balance and optimize a distribution of online reviews for the merchant 203. In some implementation, a single online third party review site may be identified to send a single invite. In other implementations, multiple sites may be identified for send a bulk number of invitations to reviewers. For example, the source system 201a may allocate invitations based on chosen distribution parameters. In one example, a bulk number of invitations may be split according to the distribution parameters specified by the merchant 203. If a certain contact type (e.g., email/SMS) for the invitations is only valid for certain target sites identified by the distribution parameters, the invitations are distributed accordingly between those sites that support the contact type.

In block 506, method 501 causes the online third party site to transmit a reviewing object to the client device for posting the online review of the location of the merchant. For example, the reviewing object may be a dynamic redirection container 145 for an online review request 140 for a review of a merchant 205. In some implementation, the dynamic redirection container 145 may be, but not limited to a computer readable object comprising dynamic URL, text message or other types of controls for redirecting the display of a user's client device to a particular Internet resource. In some implementations, method 501 may trigger the online third party site to send the reviewing object by using, for example, a provider API 270. For example, a service provider computer platforms 201b associated with the online third party site provides a plurality of modules 270, 280 with which the source system 201a interacts for carrying out operations for triggering the generation of the reviewing objects. In some implementations, the method 501 may provide via the provider API 270 a list of client devices or other identifying information of the reviewers for the online third party site to transmit a reviewing object.

Figure 5B:
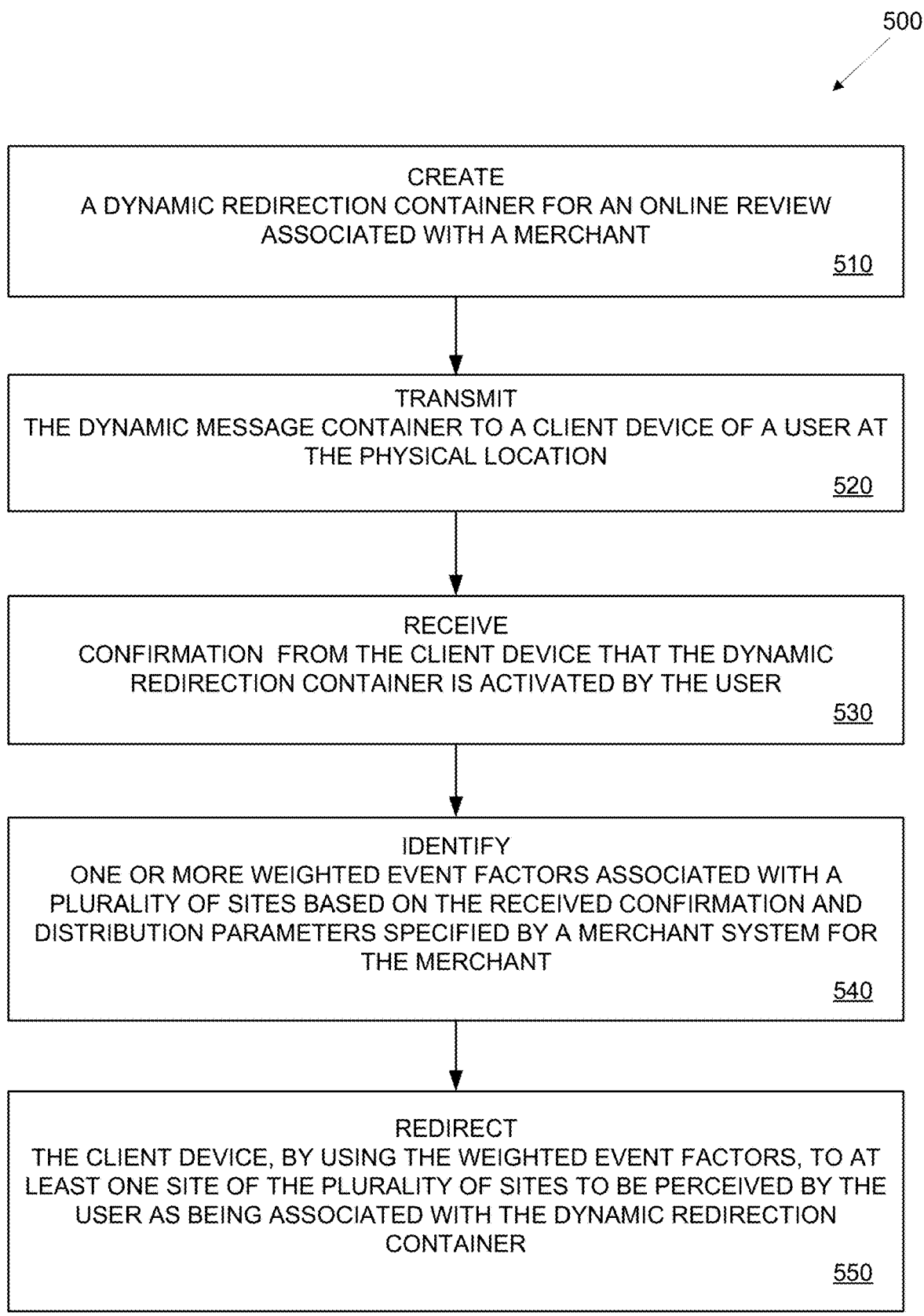
FIG. 5B illustrates a flow diagram of a method for optimizing dynamic review generation for redirecting request links in accordance with one or more aspects of the disclosure.

FIG. 5B illustrates a flow diagram of a method 500 in accordance with one or more aspects of the disclosure. In one implementation, processing device 201 of FIG. 2 as executed by the dynamic review optimizer logic 160 of FIG. 1 may perform method 500 to optimize dynamic review generation for redirecting request links. The method 500 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 500 and each of its individual functions. In certain implementations, a single processing thread may perform method 500. Alternatively, two or more processing threads with each thread executing one or more individual functions, routines, subroutines, or operations may perform method 500. It should be noted that blocks of method 500 depicted in FIG. 5 can be performed simultaneously or in a different order than that depicted.

Referring to FIG. 5B, at block 510, method 500 creates a dynamic redirection container 145 for an online review request 140 for a review of a merchant 205. In block 520, the dynamic redirection container 145 is transmitted to a client device of a user 207 at the physical location 215. A confirmation 217 is received from the client device 130 in block 530 that the dynamic redirection container is activated by the user. In block 540, one or more weighted event factors 155-1 through N associated with a plurality of sites 150-1 through N are identified based on the received confirmation 217 and distribution parameters 300 specified by a merchant system 120 for the merchant 205. In block 550, the client device 130 is redirected, in accordance with the weighted event factors 155-1 through N, to at least one site of the plurality sites 150-1 through N as being associated with the dynamic URL 230.

Figure 6:
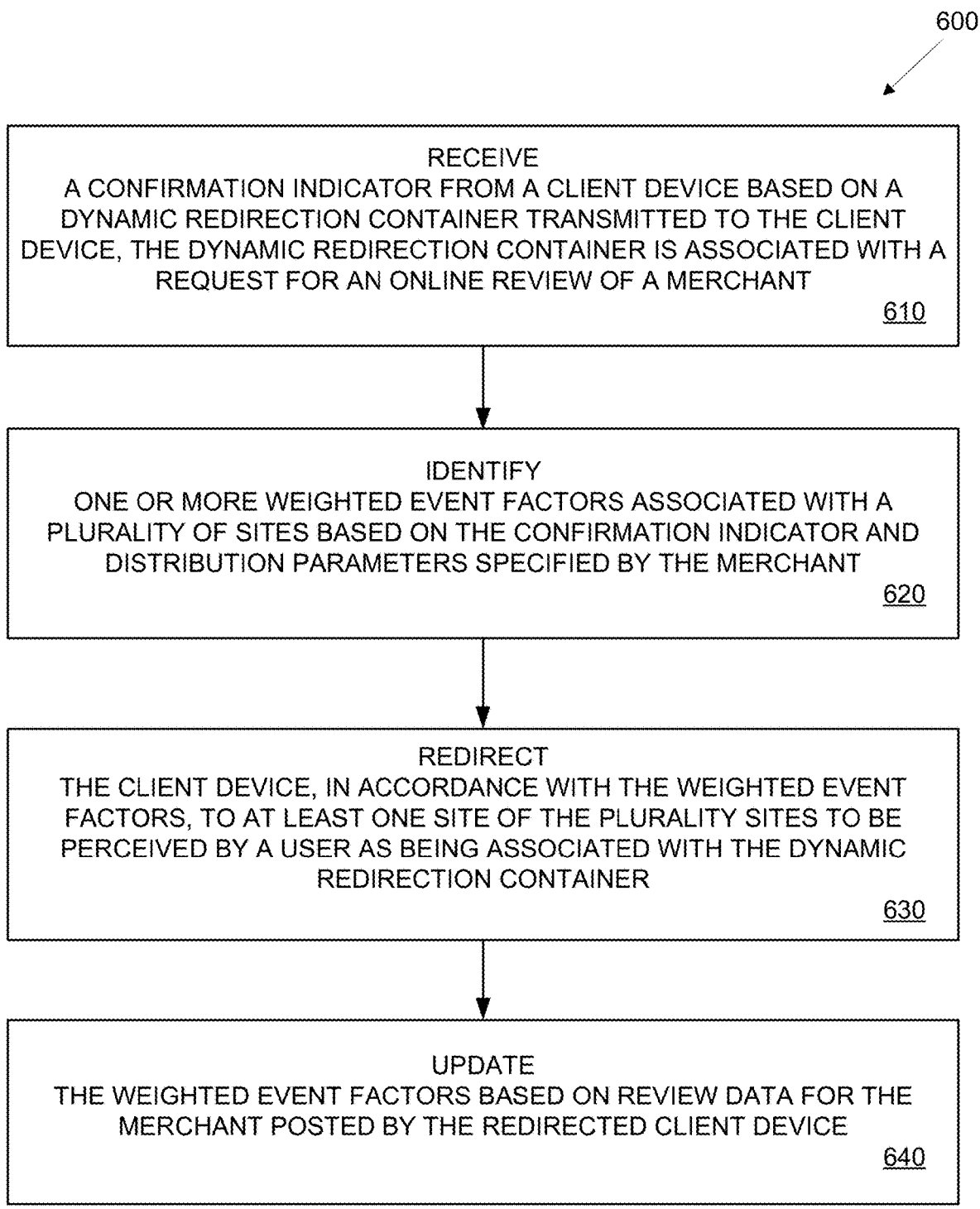
FIG. 6 illustrates a flow diagram of a method for modifying optimized dynamic review generation for redirecting request links in accordance with one or more aspects of the disclosure.

FIG. 6 illustrates a flow diagram of a method 600 for in accordance with one or more aspects of the disclosure. In one implementation, processing device 201 of FIG. 2 as executed by the dynamic review optimizer logic 160 of FIG. 1 may perform method 600 to modify optimized dynamic review generation for redirecting request links. The method 600 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 600 and each of its individual functions. In certain implementations, a single processing thread may perform method 600. Alternatively, two or more processing threads with each thread executing one or more individual functions, routines, subroutines, or operations may perform method 600. It should be noted that blocks of method 600 depicted in FIG. 6 can be performed simultaneously or in a different order than that depicted.

Referring to FIG. 6, at block 610, method 600 receives a confirmation indicator 217 from a client device 130 based on a dynamic redirection container 145 transmitted to the client device 130, the dynamic redirection container 145 is associated with a request 140 for an online review of a merchant 205. In block 620, one or more weighted event factors 155-1 through N associated with a plurality of sites 150-1 through N are identified based on the confirmation indicator 137 and distribution parameters 300 specified by the merchant 205. In block 620, the client device 130 redirect, in accordance with the weighted event factors 155-1 through N, to at least one site of the plurality sites 150-1 through N to be perceived by a user 207 as being associated with the dynamic redirection container 145. In block 620, the weighted event factors 155-1 through N are updated based on review data 260 for the merchant 205 posted by the redirected client device 130.

Figure 7:
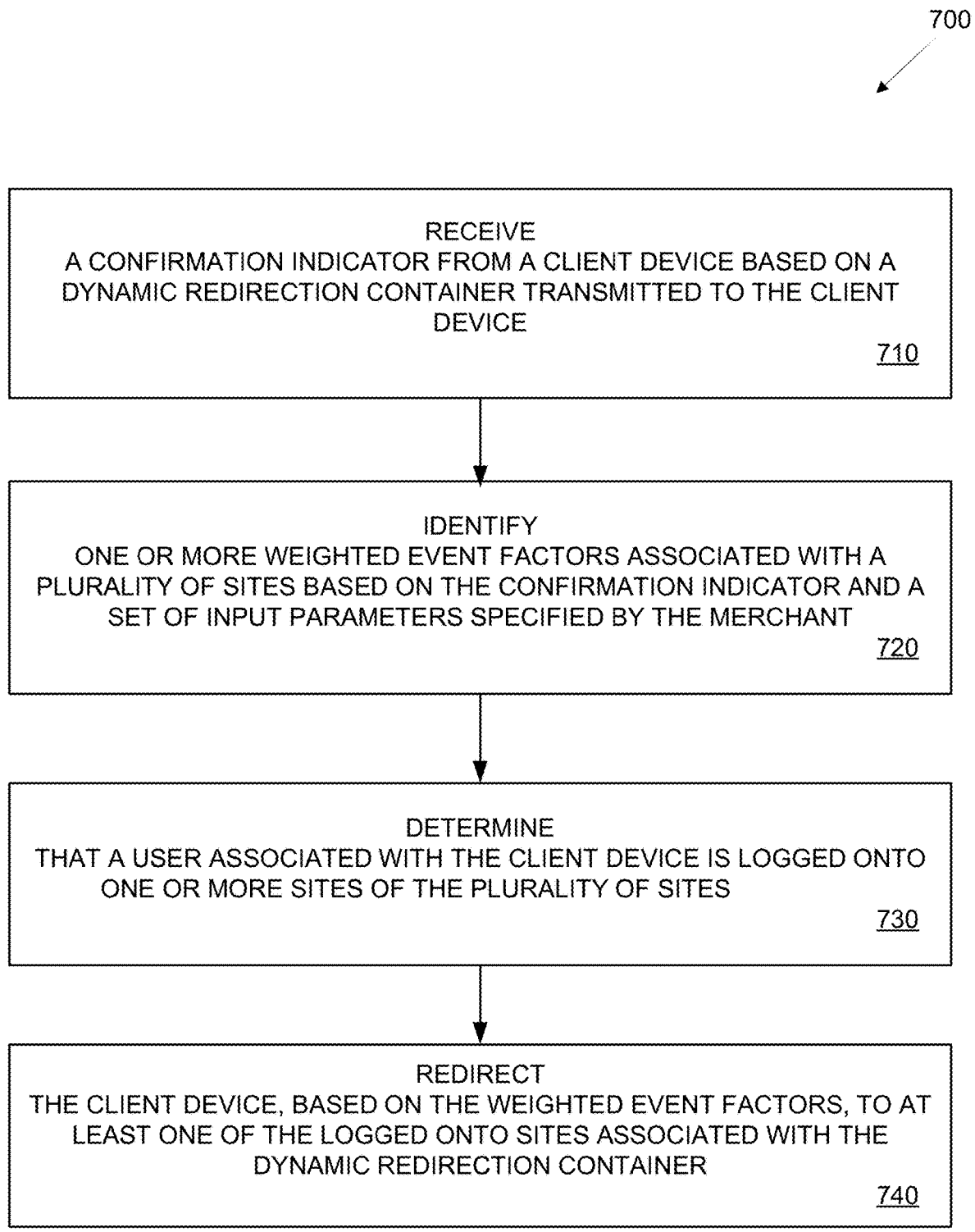
FIG. 7 illustrates a flow diagram of a method for optimizing dynamic review generation for redirecting request links based on user login information in accordance with one or more aspects of the disclosure.

FIG. 7 illustrates a flow diagram of a method 700 in accordance with one or more aspects of the disclosure. In one implementation, processing device 201 of FIG. 2 as executed by the dynamic review optimizer logic 160 of FIG. 1 may perform method 700 to optimize dynamic review generation for redirecting request links based on user login information. The method 700 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 700 and each of its individual functions. In certain implementations, a single processing thread may perform method 700. Alternatively, two or more processing threads with each thread executing one or more individual functions, routines, subroutines, or operations may perform method 700. It should be noted that blocks of method 700 depicted in FIG. 7 can be performed simultaneously or in a different order than that depicted.

Referring to FIG. 7, at block 710, method 700 receives a confirmation indicator 217 from a client device 130 based on a dynamic redirection container 145 transmitted to the client device 130. In block 720, one or more weighted event factors 155-1 through N associated with a plurality of sites 150-1 through N are identified based on the confirmation indicator 217 and a set of input parameters 320-340 specified by the merchant 205. It is determined in block 730 that a user 207 associated with the client device 130 is logged onto one or more sites 290 of the plurality of sites 150-1 through N. In block 740, the client device 130, based on the weighted event factors 155-1 through N, is redirected to at least one of the logged onto sites associated with the dynamic redirection container 145.

Figure 8:
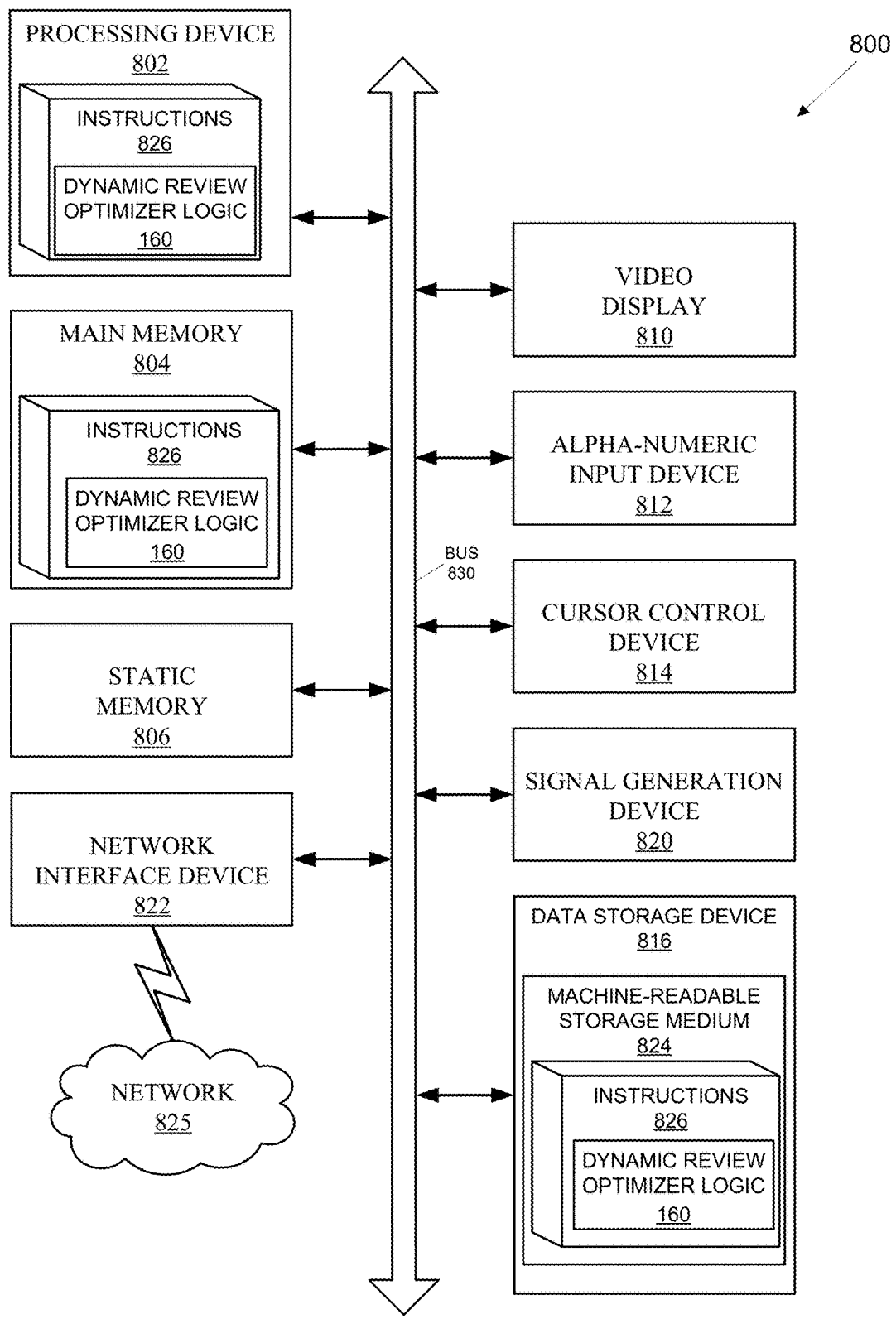
FIG. 8 illustrates an example computer system operating in accordance with some embodiments of the disclosure.

FIG. 8 illustrates an example computer system 800 operating in accordance with some embodiments of the disclosure. In FIG. 8, a diagrammatic representation of a machine is shown in the exemplary form of the computer system 800 within which a set of instructions, for causing the machine to perform any one or more of the methodologies discussed herein, may be executed. In alternative embodiments, the machine 800 may be connected (e.g., networked) to other machines in a local area network (LAN), an intranet, an extranet, or the Internet. The machine 800 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 800. Further, while only a single machine is illustrated, the term "machine" shall also be taken to include any collection of machines that individually or jointly execute a set (or multiple sets) of instructions to perform any one or more of the methodologies discussed herein.

The Example computer system 800 may comprise a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 816), which may communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute dynamic review optimizer logic 160 for performing the operations and steps discussed herein. For example, the processing device 802 may be configured to execute instructions implementing method 500, method 600 and 700, for optimizing dynamic review generation for redirecting request links, in accordance with one or more aspects of the disclosure.

Example computer system 800 may further comprise a network interface device 822 that may be communicatively coupled to a network 825. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 820 (e.g., a speaker).

Data storage device 816 may include a computer-readable storage medium (or more specifically a non-transitory computer-readable storage medium) 824 on which is stored one or more sets of executable instructions 826. In accordance with one or more aspects of the present disclosure, executable instructions 826 may comprise executable instructions encoding various functions of the dynamic review optimizer logic 160 in accordance with one or more aspects of the present disclosure.

Executable instructions 826 may also reside, completely or at least partially, within main memory 804 and/or within processing device 802 during execution thereof by example computer system 800, main memory 804 and processing device 802 also constituting computer-readable storage media. Executable instructions 826 may further be transmitted or received over a network via network interface device 822.

While computer-readable storage medium 824 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "creating," "transmitting," "receiving," "producing," "redirecting," "updating," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:
   a memory to store instructions; and
   a processing device, operatively coupled to the memory to execute the instructions to perform operations comprising:
   receiving, from a merchant system associated with a merchant, a first set of weight values corresponding to a plurality of websites configured to receive one or more reviews associated with the merchant;
   determining, based on the first set of weight values, a first set of target distribution values corresponding to the plurality of websites;
   identifying a first website of the plurality of websites based at least on the first set of target distribution values;
   providing, to a first user system, a first request to provide a first review of the merchant, the first request comprising a first link corresponding to the first website of the plurality of websites;
   receiving, via an application programming interface associated with the first website, information associated with the first request;
   providing, to the merchant system, a display comprising the information associated with the first request;
   receiving, from the merchant system, a first updated weight value corresponding to the first website and a second updated weight value corresponding to a second website of the plurality of websites based at least on the information received by the merchant system;
   identifying, by a container associated with a second request to provide a second review of the merchant, a second website of the plurality of websites based on the second updated weight value; and
   redirecting, via the container, a web browser of a second user system to the second website for posting the second review of the merchant.

2. The system of claim 1, wherein each weight value of the set of weight values comprises an integer in a range from a lowest weight value to a highest weight value.

3. The system of claim 1, the operations further comprising an aggregate average rating associated with the merchant, wherein the aggregate average rating corresponds to a set of reviews received by the plurality of websites.

4. The system of claim 3, the operations further comprising determining a first average rating associated with the merchant, wherein the first average rating corresponds to a subset of reviews received by the first website.

5. The system of claim 4, the operations further comprising determining that a condition is satisfied indicating that a difference between the first average rating and the aggregate average rating is greater than a threshold level.

6. The system of claim 5, wherein the first request is provided to the first user system in view of satisfaction of the condition.

7. The system of claim 1, the operations further comprising determining that a condition is satisfied indicating a date of receipt by the first website of a most recent review associated with the merchant is greater than a threshold time period.

8. The system of claim 7, wherein the first request is provided to the first user system in view of satisfaction of the condition.

9. A method comprising:
   receiving, from a merchant system associated with a merchant, a first set of weight values corresponding to a plurality of websites configured to receive one or more reviews associated with a merchant;
   determining, by a processing device based on the first set of weight values, a first set of target distribution values corresponding to the plurality of websites;
   identifying a first website of the plurality of websites based at least on the first set of target distribution values;

providing, to a first user system, a first request to provide a first review of the merchant, the first request comprising a first link corresponding to the first website of the plurality of websites;

receiving, via an application programming interface associated with the first website, information associated with the first request;

providing, to the merchant system, a display comprising the information associated with the first request;

receiving, from the merchant system, a first updated weight value corresponding to the first website and a second updated weight value corresponding to a second website of the plurality of web sites based at least on the information received by the merchant system;

identifying, by a container associated with a second request to provide a second review of the merchant, a second website of the plurality of websites based on the second updated weight value; and redirecting, via the container, a web browser of a second user system to the second website for posting the second review of the merchant.

10. The method of claim 9, wherein each weight value of the set of weight values comprises an integer in a range from a lowest weight value to a highest weight value.

11. The method of claim 9, further comprising an aggregate average rating associated with the merchant, wherein the aggregate average rating corresponds to a set of reviews received by the plurality of websites.

12. The method of claim 11, further comprising determining a first average rating associated with the merchant, wherein the first average rating corresponds to a subset of reviews received by the first website.

13. The method of claim 12, further comprising determining that a condition is satisfied indicating that a difference between the first average rating and the aggregate average rating is greater than a threshold level.

14. The method of claim 13, wherein the first request is provided to the first user system in view of satisfaction of the condition.

15. The method of claim 9, further comprising:
determining that a condition is satisfied indicating a date of receipt by the first website of a most recent review associated with the merchant is greater than a threshold time period, wherein the first request is provided to the first user system in view of satisfaction of the condition.

16. A non-transitory computer-readable medium comprising instructions that, when executed by a processing device, cause the processing device to perform operations comprising:
receiving, from a merchant system associated with a merchant, a first set of weight values corresponding to a plurality of websites configured to receive one or more reviews associated with a merchant;

determining, based on the first set of weight values, a first set of target distribution values corresponding to the plurality of websites;

identifying a first website of the plurality of websites based at least on the first set of target distribution values;

providing, to a first user system, a first request to provide a first review of the merchant, the first request comprising a first link corresponding to the first website of the plurality of websites;

receiving, via an application programming interface associated with the first website, information associated with the first request;

providing, to the merchant system, a display comprising the information associated with the first request;

receiving, from the merchant system, a first updated weight value corresponding to the first website and a second updated weight value corresponding to a second website of the plurality of websites based at least on the information received by the merchant system;

identifying, by a container associated with a second request to provide a second review of the merchant, a second website of the plurality of websites based on the second updated weight value; and redirecting, via the container, a web browser of a second user system to the second website for posting the second review of the merchant.

17. The non-transitory computer-readable medium of claim 16, the operations further comprising an aggregate average rating associated with the merchant, wherein the aggregate average rating corresponds to a set of reviews received by the plurality of websites.

18. The non-transitory computer-readable medium of claim 17, the operations further comprising determining a first average rating associated with the merchant, wherein the first average rating corresponds to a subset of reviews received by the first website.

19. The non-transitory computer-readable medium of claim 18, the operations further comprising:
determining that a condition is satisfied indicating that a difference between the first average rating and the aggregate average rating is greater than a threshold level, wherein the first request is provided to the first user system in view of satisfaction of the condition.

20. The non-transitory computer-readable medium of claim 16, the operations further comprising determining that a condition is satisfied indicating a date of receipt by the first website of a most recent review associated with the merchant is greater than a threshold time period, wherein the first request is provided to the first user system in view of satisfaction of the condition.

\* \* \* \* \*